June 16, 1942.  G. A. RUBISSOW  2,286,381
METHOD AND DEVICE FOR FORCED TAKEOFF AND FORCED
LANDING OF AIRPLANES AND AIRSHIPS
Filed March 14, 1939   5 Sheets-Sheet 1
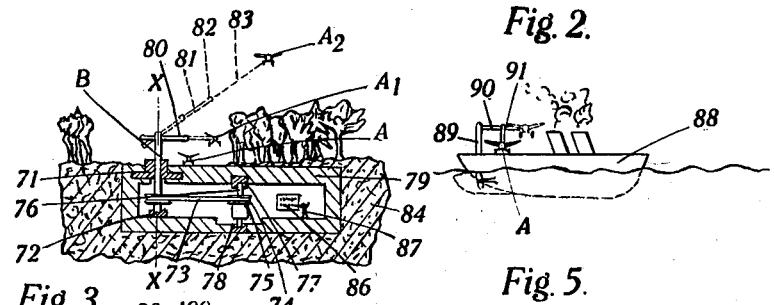
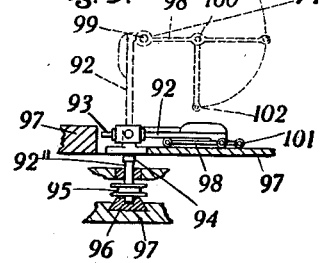
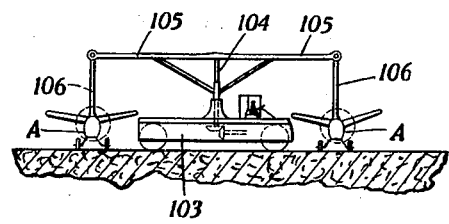
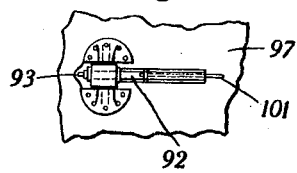
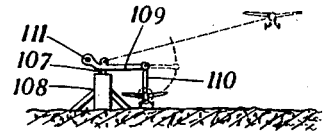
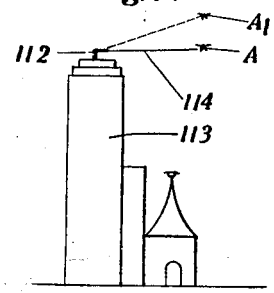
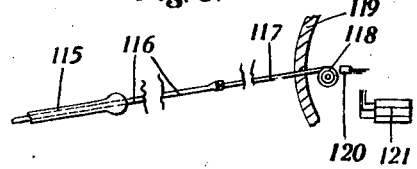
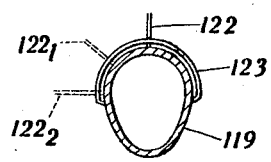
Inventor
George A. Rubissow June 16, 1942.   G. A. RUBISSOW   2,286,381
METHOD AND DEVICE FOR FORCED TAKEOFF AND FORCED
LANDING OF AIRPLANES AND AIRSHIPS
Filed March 14, 1939   5 Sheets-Sheet 2

Inventor
George A. Rubissow

June 16, 1942.       G. A. RUBISSOW       2,286,381
METHOD AND DEVICE FOR FORCED TAKEOFF AND FORCED
LANDING OF AIRPLANES AND AIRSHIPS
Filed March 14, 1939        5 Sheets-Sheet 3

Inventor
George A. Rubissow

June 16, 1942.  G. A. RUBISSOW  2,286,381
METHOD AND DEVICE FOR FORCED TAKEOFF AND FORCED
LANDING OF AIRPLANES AND AIRSHIPS
Filed March 14, 1939  5 Sheets-Sheet 4
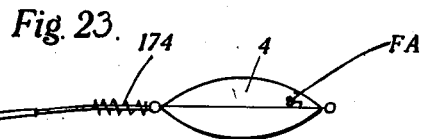
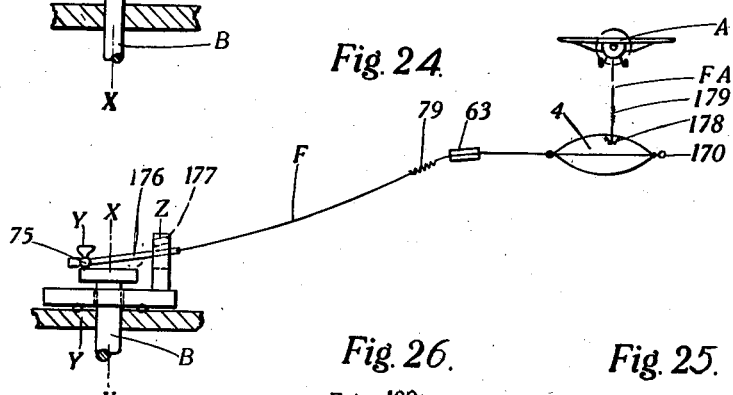
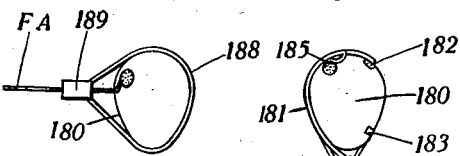
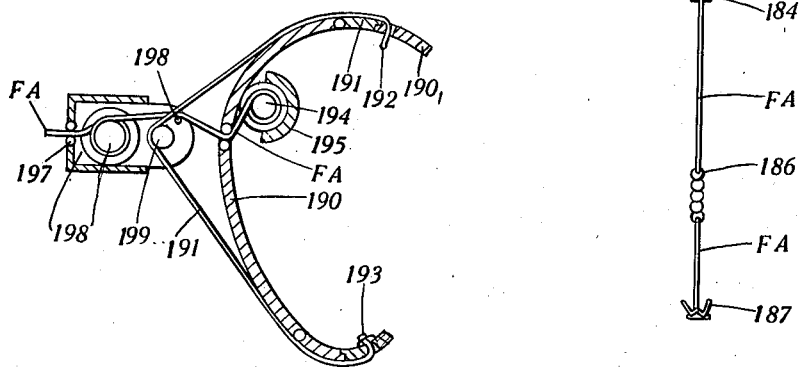
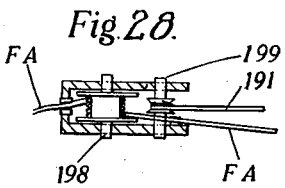
Inventor
George A. Rubissow Patented June 16, 1942

2,286,381

UNITED STATES PATENT OFFICE 2,286,381

METHOD AND DEVICE FOR FORCED TAKE-OFF AND FORCED LANDING OF AIRPLANES AND AIRSHIPS

George Alexis Rubissow, New York, N. Y.

Application March 14, 1939, Serial No. 262,239

10 Claims. (Cl. 244—63)

This invention consists in a new method for takeoff and landing of airplanes, airships and the like. It is known that airplanes in order to take-off from the ground need sufficient space at the air field to fully develop the initial speed enabling them to make such a takeoff. Certain catapult devices are used for take-off of military airplanes, but the same create many difficulties because the force to be employed to shoot out the plane is extremely great and submits the plane to destructive vibrations. For the convenience of the description when speaking about airplane or plane it will always mean any kind of airplane, airship, self-propelling air bomb, etc.

One aspect of this invention provides a new method for take-off into the air of airplanes and consist in attaching the airplane, preferably through the intermediary off and on and of a suitable connecting means, semi-rigid, flexible, or any combination of them to a rotating preferably vertical shaft driven by motor force; so attached airplane is then submitted to a rotation while continuously periodically increasing and decreasing the radius of its rotation around the vertical shaft—i. e. continuously periodically increasing or decreasing the distance between the axis of the shaft and the center of gravity of the airplane; so rotated airplane is at the pre-determined moment released i. e. disconnected automatically from the connecting means and thus achieve a take-off in the air following a chosen desirable direction. The release of the airplane from the connecting means could take place at a pre-determined speed of rotation sufficient for providing a suitable tangential speed for the take-off of the airplane.

Another aspect of this invention consists of a mechanical device to be employed for accomplishing the appliance of this method, which method itself cannot be performed without such a device. One aspect of such device consists of a mechanism operatively inter-connected with a vertical shaft driven by motor force, which mechanism provides continuous periodical changes of the distance between the airplane attached through connecting means to this mechanism during the rotation of the mechanism. Such periodical changes thus periodically decrease and increase the centrifugal force acting on the center of gravity of the airplane, thus providing acceleration and de-accelerations of the weight of the airplane in the direction of the radius of rotation of the said aeroplane, and also correspondingly influences its tangential speed.

Another aspect of this invention provides a method to take off airplanes from any small area such as the top of the house, top of a sky-scraper, suitable tower, a ship, a truck, from the middle of forest, from a railroad car, etc., on which the required device has to be mounted.

In all these cases, only a very small space is required because when the plane begins to rotate around the shaft the plane may at the same time start to rise in the air, and owing to the fact that it can increase the radius of rotation by means of a flexible or rigid connection as it will be shown in this specification it can thus, still remaining attached to the shaft, lift up higher and higher, with the assistance of the airscrew and the governors of altitude, among the other buildings or trees and the like, and at a suitable height take-off without any difficulty or risk.

Another aspect of this invention consists of a method and of devices for forced landing of a flying plane. Same device as described previously for take-off may be used for the forced landing and it may be situated in the same plane. This device may be used where a normal landing is impossible. How can you land on the top of the RCA Building in New York, or on the top of the Eiffel Tower in Paris?

According to this method it can be realized very easily. One aspect of such a method for forced landing consists in rotating the device, similar as employed for taking off, but without the plane being attached to it, the end of the arm or of the flexible connection being provided with special net-like-member, which net-member has to be of sufficiently large dimensions and while rotating simultaneously with the driving shaft it remains at a sufficient height and distance from it.

This net-member will describe large circles in the air and its tangential velocity may be chosen to be approximately equal to the velocity of the plane to be landed. The plane should then fly approximately following this net-member and should attach itself to the net-member by suitable lock-hook means, such attachment being performed at the appropriate radius of rotation and at a suitable moment. From such moment the airplane is thus obliged to follow the way of the net member, and from this moment, means are provided that the radius of rotation may be diminished, and as soon as the plane approaches the shaft the rotation will be stopped and the plane remaining attached to the shaft through the intermediary of the arm or flexible connection is then considered as landed.

The word "landed" is employed in this specification in the sense that the plane after landing remains attached to the shaft or its arm, i. e., suspended in the air when a suitable support is placed under the plane.

This invention enables the landing to be done on a very small area among the woods, on the top of a mountain or in the middle of the city, etc.

The above and further objects and novel features will more fully appear from the following detailed description when the same is read in connection with the accompanying drawings. It is to be expressly understood, however, that the drawings are for purposes of illustration only and are not intended as a definition of the limits of the invention.

In the drawings, wherein like reference characters refer to like parts throughout the several views, Figure 1 represents a vertical cross-sectional view of a schematical embodiment of one of the aspects of the device in the midst of a forest.

Figure 2 represents a side view of the device on a ship.

Figure 3 represents a schematical embodiment in a vertical cross-sectional view of a collapsible device.

Figure 4 is a top plan view of Figure 3.

Figure 5 is a schematical side view of a truck equipped with this device.

Figure 6 is a schematical partly cross-sectional view of the device.

Figure 7 is a schematical side view of a skyscraper and the device.

Figure 8 is a broken out part of an arm and of the flexible connection attached to it.

Figure 9 is a vertical cross-sectional view of a supporting member and of the fuselage of the plane.

Figure 23 is a schematical side view of a device provided with pulsating apparatus and lifting-wing element.

Figure 24 is a schematical view of a part of Figure 23.

Figures 25, 26 and 27 are cross-sectional views of flexible connecting means stored in the airplane.

Figure 28 is a cross-sectional plan view of a blocking element.

Figure 10:
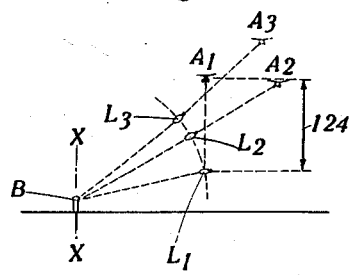
Figure 10 is a schematical side view of the net-member.

On this figure as well as on all other figures appearing in this specification, the proportional scale of drawings is not considered in respect to the reality, in order to facilitate the understanding of the drawings.

One aspect of this invention appears clearly from Figure 1, wherein B is the driven shaft of the device, which driven shaft is mounted in suitable bearing elements 71 and 72. This shaft B is driven by means of a suitable forced connection 73, attached to a motor wheel or the like 74 of the motor 75. The shaft 76 of the motor is mounted in suitable bearings 77 and 78 in the supporting frame 79. The driving shaft B is provided on the upper end with a suitable pulsating drum to which is attached pivotally an arm 80 which arm is forced to rotate simultaneously at the same angular speed as the shaft B. Another lever 81 is attached pivotally to the arm 80 and on the free end 82 of the lever 81 is attached the airplane A. When the rotating begins the airplane A first is lifted by the centrifugal force to its position $A_1$ and continuing the rotation the airplane is then mounted higher and higher arriving to position $A_2$. The airplane is attached to the free end 82 directly or by means of a suitable connection 83.

84 is the ground on which the supporting frame and all the devices are mounted so that only the top of the device, i. e. the shaft B and the arms 80 and 81 appear on the surface. 85 is the surrounding forest. 86 is a control table and 87 is the operator. This particular device is only one of several variations. The frame 79 may be made from any suitable material—steel, concrete and the like. In this Figure 1, it is shown that in the woods this device and the method hereto used could be employed on a relatively small area. Instead of having a rigid connection 83 a flexible connection may be used, which connection may be stored in the arm itself or in the airplane, or partly in the arm and partly in the plane.

In Figure 2, the ship 88 is shown equipped with the device consisting of a driven shaft 89, the arms 90 and 91 and the plane A.

In Figures 3 and 4 is shown one of the arrangements of a collapsible device consisting of a driving shaft 92 which driving shaft consists of two parts which are interlocking at point 93.

The device in its non-operative position is shown in black lines. In operating position it is shown in dotted lines. When the driving shaft 92 is rising it then contacts by its appropriate locking part 94 with the other locking part 93. The lower part of shaft 92" is provided with a suitable wheel or gear 95 which is driven by a motor force. 96 is a bearing element wherein the shaft 92 is mounted, 97 being a broken out part of the supporting frame. 98 is an arm attached to the free end of 92. The attachment is made in such a manner that when the apparatus is in its operating position the arm 98 is more or less perpendicular to the axle of rotation XX of the shaft 92, the arm 98 if desired when the apparatus is rotated may pivot around the articulation 99 so that if the airplane goes higher the arm 98 can also rise simultaneously by its free end 100. One said free end 100 is also attached preferably by an articulated connection, a supporting lever 101 on which free end 102 is then affixed the airplane A. In its non-operative position the levers are folded one in another, and instead of one lever a plurality of levers may be used.

In Figure 5 the truck 103 is equipped by driving shaft 104 driven by the motor of the truck. The arm 105 is a double one on both ends of which are pivotally attached the supporting levers 106 on the ends of which are attached the two airplanes A. When this device rotates the airplanes are lifted and may be disconnected according to the method.

Figure 6 shows another aspect where the driven shaft 107 shown schematically is mounted in a protective tube or the like 108, in which tube it rotates. Suitable bearing means may be provided between this protective tube and the shaft. The arm 109 and the supporting arm 110 are actuated by the rotation of the shaft 107 as shown in Figure 1 for the shaft B. 111 is the counterweight to balance the most suitable equilibrium.

Figure 7 shows how the device 112 is mounted on a skyscraper 113. The airplane A is attached to the device 112 by means of a connection 114, which connection may be rigid or flexible or a combination of both. When the airplane is rotated it can easily be lifted in its position $A_1$, and being disconnected from the connection it can take-off at a suitable moment.

Figure 8 shows a part of the arm 115 which is rotated. The axle of rotation is not shown. To this end of the arm 115 is attached another lever element 116 or a suitable rod or the like, or 116 may also be a flexible connection. To the other end of 116 is attached a flexible or semi-flexible connection 117, which is coiled on a suitable drum 118, affixed rigidly in respect to the airplane body from which a broken out cross-section 119 represents a part of the fuselage. The control of the coil may be effected by any mechanical, electro-mechanical, pneumatical or other means 120 and 121 represents schematically the controlling dial, operated by the pilot.

In Figure 9 is shown another form of attachment of a flexible connection 122 which is not shown in coiled form but being attached to the appropriate rigid or semi-rigid supporting member 123, having the form of a suitably shaped bar or T-form strip of strong metal rigidly affixed in respect to the fuselage 119. In dotted lines 122—1 and 122—2 are shown the corresponding position of the flexible connection. When the plane is suspended on the arm, and the shaft is not rotated, it is in position 122. As soon as it rotates, it goes through the positions 122—1 or 122—2.

In Figure 10 is shown the landing net-member L, which landing net-member is attached to the suitable part of the free end of the arm if such arm is sufficiently long, or is attached somewhere on the flexible connection. This landing net-member should be of sufficient dimensions and may be made of any suitable material, ropes, cables, or aluminum frame and the like, and of any suitable form. Its object is also one of the aspects of this invention. In Figure 10 it is shown exclusively and only by way of example, in the form of a sharpened ellipse, and it is composed of two such ellipses made from wire ropes or the like, the two ellipses being one perpendicular to another. It may also be made of three halves or five halves of the ellipses, etc.

As this device may itself when flying in the air be rotated by wind around its own large-axle, it may certainly take different positions which will hardly be controllable without suitable means. Such means may consist in wind-governors affixed on the net-member or connected with it. If such controlling means are not provided, this landing-net-member L should be made in such a form that in each of its positions it will be ready to grasp the contacting means of the airplane or be grasped by them. The airplane A of the Figure 10 is shown at the moment when it follows the landing net-member at a certain height 124 from the earth. In such a position $A_1$ and at a suitable moment, the airplane may then cast off its own suitable contacting means. At this stage Figure 1 shows the moment when the airplane has contacted the net-member L. The next stage may be of any nature; it may for instance by way of example, happen that it will be advantageous for the pilot, first to lift the arm from its position $L_1$ into its position $L_2$, and further lifting it until in positions $A_3$ and $L_3$, in which positions then the pilot can start to diminish the length of the connecting means 125. Or if desirable, the operator of the device, if he controls the length of the arm or of the connecting means will diminish them accordingly.

Figure 11:
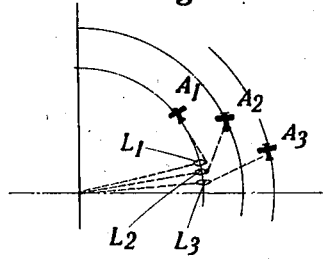
Figure 11 is a top plan view of Figure 10.

In Figure 11, the plan view of the positions $A_1$, $L_1$, $A_2$, $L_2$, $A_3$, $L_3$, are shown only schematically and by way of example, as one of many varieties.

Figure 12:
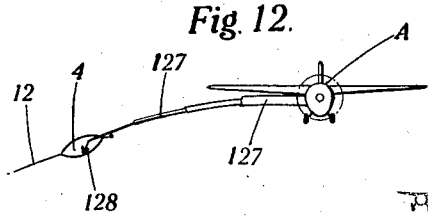
Figure 12 is a front view of the airplane with telescopic connecting means.

In Figure 12 the landing net-member L attached to the flexible connection 126 is shown in the position when the airplane has just cast off from itself a telescopic contacting means 127 on the end of which is provided a suitable hook-like or lock-like apparatus (only shown schematically in the drawings). The telescopic device 127 may be controllable in its length and of any desirable and appropriate system and form. Such telescopic means if sufficiently long may be semi-elastic, i. e. it may curve like steel under the influence of the centrifugal force, so that when it is curved, the radius of rotation is increased. If the telescopic device is employed it may also be made of such resilient steel.

By way of example, such telescopic device may for instance be folded along the fuselage of the airplane and before starting its telescoping it will then first be put in its operating position as shown in Figure 12, and then be actuated by suitable mechanism or electrical means or by gravity or by pneumatic means or by air pressure itself caused by the movement of the plane in the air.

Figure 13:
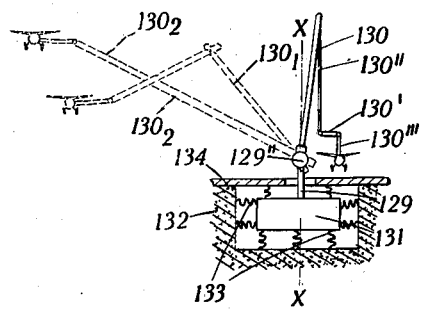
Figure 13 is a schematical cross-sectional view of an elastic spring anti-vibration mounting of the supporting frame of the device.

On Figure 13, the arm 130 is shown being of great length, and before the rotation starts it is lifted as high as possible by suitable means provided on the drum or the like to which it is connected and which drum 129″ forms a part of the shaft 129. For this particular arrangement instead of using the lever same may be replaced by flexible connection F. When the drum 129″ rotates the plane can take, at a certain speed of rotation, the position as shown in the dotted lines 130₁, and after this the position 130₂, and means may be employed to control the lifting up or descent of the arm 130 during the rotation itself. Such arm can provide a very great radius of rotation when beginning the rotation at full speed and occupy a very small radius of rotation when beginning the same. Instead of the flexible connection for this particular arrangement and for certain other arrangements there may be employed a quantity of levers which may fold together like a measuring rule. Before the rotation starts all levers are locked together but as soon as the levers are at certain heights the first lever element can be unlocked and opened, second, and so forth. This arrangement is not shown in the drawing, but a similar arrangement having only two levers working on the principle of a folding measure rule are shown in Figure 3.

It should be noted that one of the aspects of this invention consists in devices of the character described, which devices being submitted to more or less considerable efforts should be preferably mounted so that the vibration, jerks, etc. will not be entirely transmitted to the body of the building, of the ground, of the car or the ship where they are mounted. Such arrangement is shown in Figure 13 where the driving shaft 129 and the rotating arm 130 form one rigid body with the supporting frame 131 shown only schematically. The device is connected to the foundation 132 in such a manner that neither the supporting frame 131 nor the shaft 129 do contact directly the foundation 132; they contact the same only through the intermediary of elastic springs 133 the characteristics of which should correspond to the action and effort to be supported, and will absorb the main part of the vibrations, jerks and other irregularities, and in particular, absorb the jerks occurring at the moment when the airplane is disconnected from the attachment in case of take-off or is connected to the landing net-member when landing.

The foundation 132 may be made of metal, concrete or other material and it may also be provided on its upper part by a suitable supporting plate 134.

Figure 14:
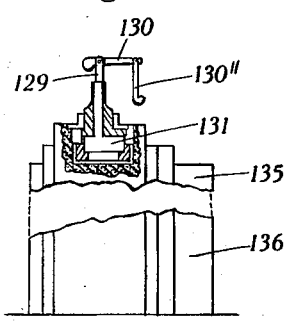
Figure 14 is a schematical cross-sectional view of the device with rubber elastic anti-vibrating mounting.

Figure 14 shows another arrangement having the same aspect as previously described for Figure 13 but wherein the device is mounted not through the intermediary of springs but through the intermediary of rubber, so surrounding the device 131 that the rubber absorbs the main part of the irregularities. The top of the building 136 is shown schematically but this rubber arrangement or a combination of rubber arrangement with the spring-arrangement may be especially important for buildings to eliminate the vibration of the same.

One other aspect of this invention consists of controlling the length of the flexible connection if such one has to be provided during the rotation of the device.

Figure 15:
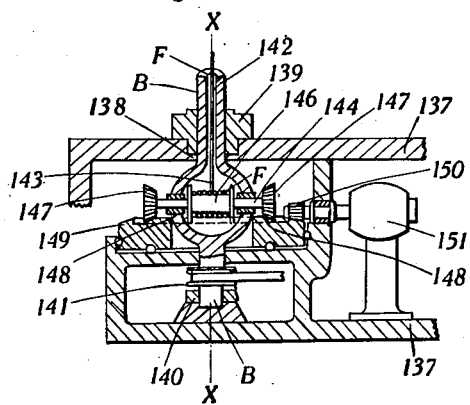
Figure 15 is a schematical cross-sectional view of the device equipped with appropriate storing-drum device for controlling the length of the flexible connection.
Figure 16:
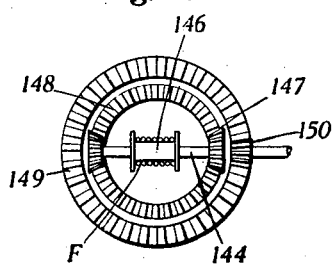
Figure 16 is a top plan view of one cross-section of Figure 15.

One of various aspects is shown by way of example on Figure 15, wherein the supporting frame 137 is provided with an opening 138 in which opening is affixed suitable bearing 139 and in which bearing is freely rotated the driving shaft B, which driving shaft B by its one end is connected to an appropriate bearing 140, attached to the lower part of the supporting frame. On the same shaft B is provided a suitable wheel 141 connected to the motor or the like, driving the shaft. The shaft B in this particular arrangement is provided inside with a tubular opening 142 through which tubular opening passes the flexible connecting means F. In an appropriate part of shaft B the said tubular opening is enlarged and forms a ball-like or any other form of free space 143; in which free space is lodged a shaft 144 which can freely rotate in respect to shaft B, and preferably perpendicular to the axle of rotation XX of the shaft B. The shaft 144 is mounted in the opening 143 through the intermediary of suitable bearings 145. On the said shaft 144 is further mounted a suitable drum or coil 146 on which drum is then coiled the suitable length of the flexible connection F. On each of the ends of the shaft 144 is mounted a gear 147 which gear has teeth inclined at a suitable angle and contacting at said angle a gear drum 148 which gear drum 148 can be freely rotated around the axle XX or around the shaft B without contacting the said shaft. This drum is provided itself with teeth having the same shape and inclination as the teeth of gear 147. Furthermore, the same drum 148 is provided with another row of teeth, which teeth form as shown in Figure 16 a circumferential gear 149 which in this particular aspect of arrangement forms one rigid body with the drum 148. The teeth of this gear 149 are contacting an appropriate gear 150 which gear is also mounted on an appropriate part of the supporting frame and is driven by a special motor 151. This motor 151 has a speed variation and torque moments entirely controllable by the operator of the device. When the device is in operation the driving shaft B is indispensably rotated with the speed necessary for the take-off or landing of the plane. When it rotates, it therefore rotates the axle 144 also, the gear of which rolls on the drum 148 as long as this drum 148 remains motionless, i. e. doesn't move in respect to the supporting frame. If now, we will move this gear drum 148 by means of the gear 150 driven by the motor 151 then it is sufficient that the speed of rotation of 148 being made so that the gear 144 will remain motionless, which only happens if the tangential velocity of the teeth of the gear 147 and of the teeth 150 of the drum 148 will be the same. That is easily realized by choosing the suitable speed of the motor 151, in such a direction that the teeth 152 of the drum 148 will move in an opposite direction to the direction of rotation of the gear 144 if supposing the drum 148 was motionless. In variating now the speed of the motor 151 we can accordingly coil or wind up the flexible connecting means F, while the shaft B remains rotating. Figures 15 and 16 represent only schematically one of the arrangements. It should be clearly understood that several other possibilities or varieties may be provided and also that the dimensions should be calculated according to the efforts to be supported.

Figure 17:
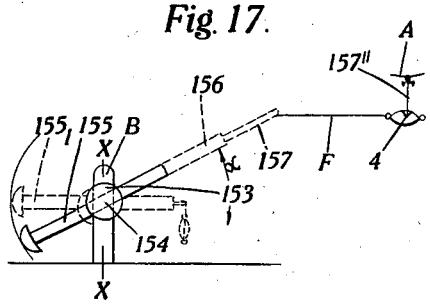
Figure 17 is a schematical side view of a device telescopic in form.

In Figure 17 is shown a combination device wherein the driving shaft B is provided with an appropriate adjustment-drum 153 arranged in such a manner that it can pivot around the axle 154 and also that through an appropriate slit in the adjustment-drum 153 may pass the arm 155. This arm is shown when in its inoperative position in dotted lines 151₁ and it is shown in its operating position under the angle α. Means can be provided that the arm 155 may be movable around the axle 154 during the operation; or that it is affixed rigidly in a predetermined position before it. Furthermore, means may be provided that this arm 155 may be pushed through the adjustment-drum 153 and be put in its fully operating position, for instance, the position 156 in dotted lines; and after taking such position, another telescopically mounted arm 157 may be extended or there may be several telescopically mounted arms. This arm 157 could be attached directly to the airplane or this can be done by means of a flexible connection F and the landing net-member L. The airplane A when contacting the net-member L is casting off a suitable connecting means 157″. The flexible connection itself or the net-member L could be provided in appropriate places by one or a plurality of signs or electrical lamps, so that when they rotate around the axle XX, these signs form circumferences of light or color and are easily visible to the pilot, who is looking to land.

Figure 18:
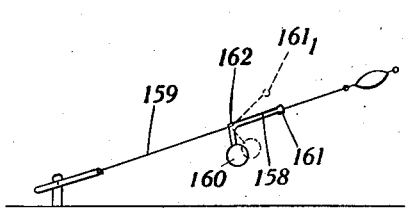
Figure 18 is a schematical side view of a device controlling the radial uplifting of the supporting or lifting wing.

In Figure 18 is shown purely schematically a lifting element 158 which lifting element being attached to the connection means 159 consists of a heavier mass 160 and of a mass 161 which is lighter than 160. The lifting element 158 is articulated in 162. When the heavier weight is urged by the centrifugal force then it lifts the lighter weight 161 into position 161₁, and by this arrangement may be obtained a control of lowering or vice versa in the direction of centrifugal force.

Figure 19:
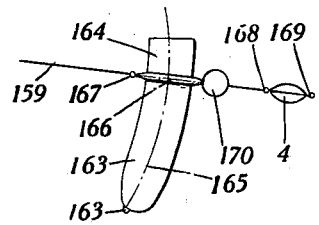
Figure 19 is a schematical top plan view of the supporting lifting wing.
Figure 20:
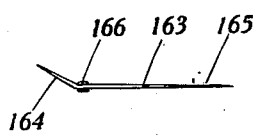
Figure 20 is a schematical side sectional view of Figure 19.

In Figure 19 is shown the lifting wing which may be of any desirable form. By way of example, it is shown only in flat-form having a cross-section according to the symmetry line 163₁ as shown in Figure 20. The front or the attacking part 164 of the lifting wing 163 may be raised on a suitable angle in respect to the tail 165 of the said lifting wing, and the attacking device 166 of the lifting wing to the connection 159 may be made in such a way by means of such attaching device 166 that during its rotation around the axle XX this lifting wing 163 by means of its long tail 165 is maintained in an appropriated position. Now then the front attacking part 164 being inclined upwardsly in respect to the tail, i. e. to the movement will therefore attack the air and will lift the whole lifting-wing 163, and this according to the distribution of the forces which occur during the rotation. The tail may be made from rigid but very light material and provided with the necessary reinforcements.

Figure 31:
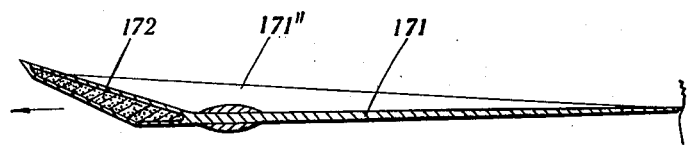
Figure 31 is a cross-sectional view of a hollow supporting lifting-wing.
Figure 32:
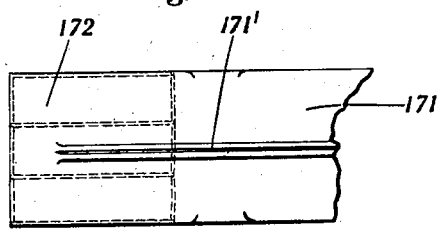
Figure 32 is a top plan view of the device of Figure 31.

On Figure 19 furthermore, is shown the lamps 167, 168 and 169 and the net-member L. Also a mass 170 may be attached on the exterior end of the attachment 166 in order to control its position by increasing the centrifugal force. On Figures 31 and 32 the lifting wing is shown having a long tail part 171, its reenforcing rib 171″ and a front attacking part 172. The front attacking part is made so that it forms a hollow body, and this hollow body may be filled with very light gases lighter than air, such as hydrogen, helium and the like, or this hollow part may be filled with depressed air, or even constitute a vacuum. By this means the volume of this hollow part 172 will be always self-lifted in respect to its lower part, thus providing a means to increase the efficiency of the lifting-wing which is a very important factor if the radius of rotation is a large one and if the weight of the flexible or other connecting means to be lifted at a certain height in respect to the arm of rotation is too high. This kind of lifting-wing, the attacking part of which is filled with light gases, may considerably increase the lifting action of the net-member.

Another aspect of this invention consists in providing such lifting-wing, which may enable the lifting up of the flexible connecting means including the net-member L, if such one is provided on same, to the sufficient height. If no rigid means are provided the flexible connecting means without the lifting-wing will automatically take a position perpendicular to the axle of rotation.

Another aspect of this invention consists of special arrangements of the device described for using the methods in case the arms attached to the shaft B are not sufficiently long and the use of long flexible connections is preferred. For taking-off of planes there is no difficulty because the plane itself once rotated around the shaft and being attached to it could lift the arm if pivotal, or lift the flexible connection as high as it is necessary. This, however, cannot be so easily realized for a forced landing, because when large radius of rotation is required it is very difficult to make long arms. On Figure 25 is shown a telescopic arm 173 which in certain cases may be applied. Being a rigid one, or resilient steel one, this arm may on its end be provided with elastic or spring means 174, so that when the contact with the airplane is made by means of net-member L the shock is absorbed in part by said elastic means. If, however, short arms should be provided and long flexible connections should be used then this may be realized by another aspect of this invention consisting of using a pulsating device as described in the U. S. patent application, Serial No. 261,860 filed March 14, 1939, "A new method and devices for the application of periodically pulsating centrifugal force" filed simultaneously with the same. Such pulsating device is shown schematically on Figures 21, 22, 24, 29 and 30.

In Figure 24 the driving shaft B is rotated around the axle XX and eccentric to this axle XX the pulsating shaft 175 is mounted eccentrically in regard to XX. The arm 176 is pivotally attached to the said pulsating shaft 175, the other end of B passing through the guide means 177 so that when the arm 176 is moved around the shaft B and simultaneously pivots around the shaft 175, it is pushed backward and forward through the guide means 177, which guide means rotate around the same axle XX at a smaller angular velocity than the angular velocity of shaft B. This can easily be realized by suitable forced connections, gear, belt means, etc. Such pulsating device enables then a repeated tightening of the flexible connection F and such connection could then be rotated to a suitable length, and because of its tightened condition, be corrected and maintained by means of this pulsating rotation. This apparatus will be described more fully in Figures 21, 22, 29 and 30.

Another aspect of this invention consists in the devices provided for controlling of flexible means stored on a drum-like member or another form easy to coil and attached to the airplane. On Figure 24 is shown an airplane which drops the connecting means FA and these means are provided with a suitable hook-lock device 178 and further by a suitable elastic means 179 so that when the hook-lock device contacts the net-member L the shock is partly absorbed by the elastic device 179.

On Figure 25 is shown schematically a cross-section of the fuselage 180 of an airplane. To this fuselage is attached a flexible girdle 181 in such a form that one end of this flexible girdle is rigidly attached to the fuselage 180 by the support 182 and the other end is attached by support 183. The flexible girdle 181 can be made of cord, wire, chain, etc. and is affixed by suitable connecting means 184 to the flexible connection FA, which flexible connections may if required be coiled on a suitable drum 185 placed in the airplane. Said flexible connection may have at an appropriate part a chain link 186 and the hook-lock device 187.

In Figure 25 the net-member and the hook-lock device may be provided with magnetic or electro-magnetic means to facilitate the contacting by magnetic or electromagnetic attraction between them. In Figure 26 instead of having a flexible girdle surrounding only a part of the fuselage such girdle 188 is surrounding the whole fuselage, and therefore the flexible connection FA can take any position around the fuselage, being maintained by the controlling device 189 of the flexible connection in the required position.

This is shown schematically on Figures 27 and 28, where 190 is the fuselage, 191 is the flexible means affixed to the fuselage in 192 and 193. The drum 194 is mounted in the fuselage and the flexible connection FA is coiled on it by a mechanical means, or by an electrical motor (not shown on the drawings). The braking control of winding up and unwinding is made by brake arrangement 195 shown schematically. The controlling locking device 189 may be arranged in different ways. By way of example, it is shown having a drum 196 around which the flexible connection FA is wound, and the same flexible connection passes through suitable rollers 197 and 198. The flexible girdle 191 forms an attachment between the airplane and the connecting means FA through a suitable roller 199. The position of the device 189 is shown with the airplane sideways to the flexible connection. Suitable braking means, electrical-mechanical, electro-magnetical or other may be provided to control the forces to which the flexible means FA will be submitted.

Figure 21:
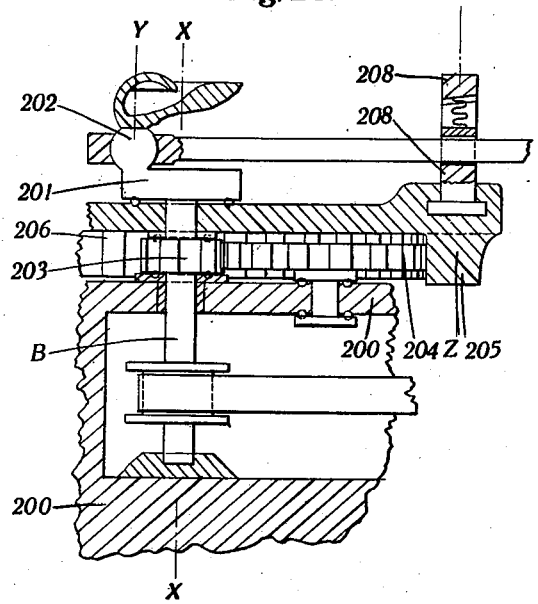
Figure 21 is a schematical vertical sectional view of the device equipped with pulsating apparatus.

One other aspect of this invention is the use of the pulsating apparatus as shown on Figure 21, wherein the driving shaft B is mounted in a frame 200; on the free end of the said shaft B is affixed the pulsating apparatus by means of the drum 201 and the axis 202 mounted on the said drum, said axis not coinciding with the axle XX of shaft B. A gear 203 is affixed to the shaft B, and establishes a forced connection with another gear 204 which is mounted also in the supporting frame 201 and interconnects the gear 203 with a driven drum 205 provided with teeth 206 having the same form as the teeth of 204 and 203. The ratio between the number of teeth of all the gears 203, 204 and 205 are so chosen that the required pulsations are obtained. On the axis 202 is mounted an arm 207 which pulsates, being guided through guide means 208.

Figure 22:
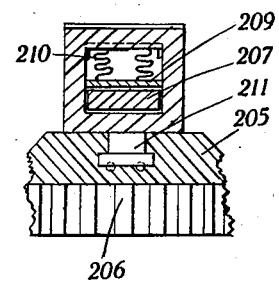
Figure 22 is a schematical cross-sectional view of the guide means of Figure 1.

On Figure 22 is shown the cross-section through the axis ZZ on Figure 21. To prevent the arm 207 from unnecessary vertical displacements there is provided an element 209 which by means of spring 210 slightly presses on the sliding surface of the arm 207. The guide means 208 may be rotated around the axis 211 affixed in the drum 205.

Figure 29:
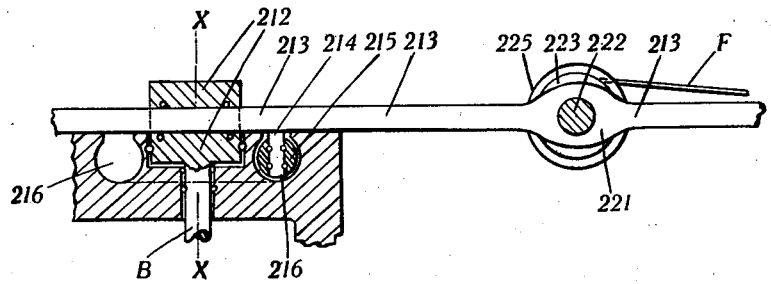
Figure 29 is a cross-sectional side view of a device provided with pulsating arrangement.
Figure 30:
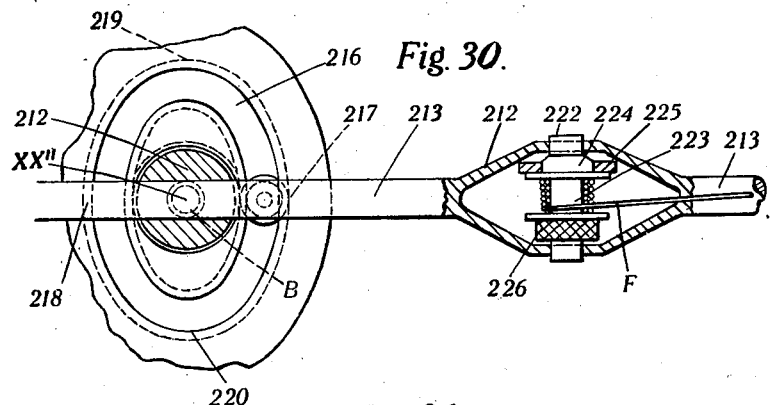
Figure 30 is a plan view of the device of Figure 29, partly in cross-section with parts broken out.

On Figures 29 and 30 is shown a device for rotating the airplanes provided with pulsating apparatus of extremely simple form. The shaft B is provided on its free end with guide means 212 in which guide means is mounted the arm 213, said arm being provided at a suitable distance from the axle of rotation XX with a pulsating axis 214, around which is mounted a bearing 215. The said pulsating axis and bearing are lodged in a guideway 216 as shown in Figures 29 and 30, the counter of this guideway being of suitable form and by way of example, as shown in Figure 30 this form is an elliptical-like one. As it may be seen from Figure 30, the said guideway 216 in points 217 and 218 approaches closest to the center of rotation XX'' and in points 219 and 220 it is furthest away. The roller has to move accordingly in this guideway and therefore approaches to or retreats from the axle of rotation XX'', creating by the same, two pulsations per one revolution of the shaft. Furthermore, this particular arrangement provides pulsations strictly coinciding with the radius of rotation, i. e. with the direction of the centrifugal force.

The arm 213 may be provided with an enlargement 221 as shown on Figures 29 and 30, in which enlargement is mounted a shaft 222 on which shaft a coil 223 is so affixed that it could receive the necessary length of the flexible connection F. On the same shaft 222 may be further mounted a braking drum 224 and the brake 225 shown schematically as well as an electrical motor 226 or a relay which may be employed for controlling or turning in one or another direction the shaft 222.

Although certain forms of the present invention have been described in the application by way of illustration, it will be understood that these are not intended to limit the invention either in respect of the method used or in respect to the said devices.

Having now particularly described and ascertained the nature of my said invention and in what manner the same is to be used, I declare that what I claim is:

1. A device for launching or landing an airplane comprising a supporting frame, a vertical shaft mounted thereon, a motor to rotate the said shaft, means to control the speed of rotation of the said shaft, an arm provided on the said shaft, a flexible connection mounted on the free end of the said arm, means to wind and unwind the said flexible connection during the said rotation, means attached to the end of the said flexible connection to connect the said airplane with the said flexible connection, a part near the end of the said flexible connection being provided with means to lift the said end of the said flexible connection, said means consisting of a hollow wing filled with light gas, the front end of the said wing being raised.

2. A device for launching or landing an airplane comprising a supporting frame, a vertical shaft mounted thereon, a motor to rotate the said shaft, means to control the speed of rotation of the said shaft, an arm provided on the said shaft, a flexible connection mounted on the free end of the said arm, means to wind and unwind the said flexible connection during the said rotation, means attached to the end of the said flexible connection to connect the said airplane with the said flexible connection, a part near the end of the said flexible connection being provided with means to lift the said end of the said flexible connection, said means consisting of a wing, the front end of which is raised.

3. A device for launching or landing an airplane comprising a supporting frame, a vertical shaft mounted thereon, a motor to rotate the said shaft, means to control the speed of rotation of the said shaft, an arm provided on the said shaft, a flexible connection mounted on the free end of the said arm, means to wind and unwind the said flexible connection during the said rotation, means attached to the end of the said flexible connection to connect the said airplane with the said flexible connection, a part near the end of the said flexible connection being provided with means to lift the said end of the said flexible connection, said means to lift consisting of a member having an aerodynamic form, said member being filled with light gas so that the weight of the said member is lighter than air.

4. A device for launching or landing an airplane comprising a supporting frame, a vertical shaft mounted thereon, a motor to rotate the said shaft, means to control the speed of rotation of the said shaft, a first arm provided on the said shaft, a second pivotal arm attached to the said first arm, the said first arm being pivotally attached to the said shaft, means to control the angle of inclination of the said first arm in respect to the shaft during the rotation, a flexible connection mounted on the free end of the said second arm, means to wind and unwind the said flexible connection during the said rotation, means attached to the end of the said flexible connection to connect the said airplane with the said flexible connection.

5. A method of character referred to, of launching an airplane consisting of, first: attaching the said airplane by connecting means to a free end of a flexible connection, suspended from the end of an arm, said flexible connection being wound on a coil; second, rotating said arm around a shaft whereby the said airplane and the said flexible connection attached to it are rotated around the said shaft through the intermediary of said arm which is attached to the said shaft, and simultaneously, third: when continuing the rotation, during each of the said rotations periodically augmenting and diminishing each of the radii of rotation for a predetermined measurement, whereby the pulsating, centrifugal force thereby produced is applied to the said airplane, such said periodical augmenting and diminishing for the said predetermined measurement, to take place a desirable number of times during each of said rotations, fourth: unwinding progressively the said flexible connection until a radius of rotation is reached sufficient to enable the airplane to fly on its own power, (preferably assisted by the motor-driven propeller), fifth: disconnecting the said airplane from the said flexible connection as soon as the required speed of rotation is attained, sixth: continuing the rotation of the said flexible connection while simultaneously rewinding the said flexible connection and while continuing to maintain the said pulsating, centrifugal force.

6. A method for the landing of an airplane. consisting of, first: rotating a shaft on which an arm is provided, to which arm a flexible connection wound on a coil is operatively connected, second: rotating the said shaft, arm and said flexible connection while progressively unwinding the said flexible connection, and while simultaneously with such unwinding periodically augmenting and diminishing for a predetermined measurement each of the radii of rotation, corresponding to the said progressive unwinding, which periodical augmenting and diminishing takes place a desirable number of times during each of said rotations, thereby producing the pulsating centrifugal force of the character referred to, which enables the said flexible connection while continuing to rotate, to attain a sufficient radius of rotation such as to form an imaginary circle in the air that will easily enable the airplane to substantially follow the said circle, and third: following the said imaginary circle at the same speed at which the free end of the said flexible connection describes the said imaginary circle in the air, fourth: the said airplane then establishes contact with the said free end of the said flexible connection, fifth: rewinding the said flexible connection with the said airplane attached thereto, while simultaneously continuing the said producing of the pulsating, centrifugal force, preferably until the said flexible connection is rewound and the airplane is suspended on the said arm, sixth: ceasing the rotation of the said shaft, arm, flexible connection, and said airplane, whereby landing of said airplane is effected.

7. A method for the landing of an airplane, consisting of, first: rotating a shaft on which an arm is provided, to which arm a flexible connection wound on a coil is operatively connected, second: rotating the said shaft, arm and said flexible connection while progressively unwinding the said flexible connection, and while simultaneous with such unwinding, periodically augmenting and diminishing for a predetermined measurement each of the radii of rotation, corresponding to the said progressive unwinding, which periodical augmenting and diminishing takes place a desirable number of times during each of said rotations, thereby producing the pulsating, centrifugal force of the character referred to, which enables the said flexible connection while continuing to rotate, to attain a sufficient radius of rotation such as to form an imaginary circle in the air, while simultaneously raising the free end of the said rotated flexible connection by lifting means to the desired height, whereby the said imaginary circle in the air is elevated and will easily third: enable the said airplane to substantially follow the said circle at the same speed at which the free end of the said flexible connection describes the said imaginary circle in the air, fourth: the said airplane then establishes contact with the said free end of the said flexible connection, fifth: rewinding the said flexible connection with the said aeroplane attached thereto, while simultaneously continuing the said producing of the said pulsating, centrifugal force, preferably until the said flexible connection is rewound and the airplane is suspended on the said arm, sixth: ceasing the rotation of the said shaft, arm, flexible connection, and said airplane, whereby landing of said airplane is effected.

8. A method for launching an airplane consisting of, first, rotating an airplane around a driven shaft to which said shaft the said airplane is attached through suitable connecting means; second, progressively unwinding the said connecting means thus increasing progressively the radius of rotation of the said airplane and simultaneously periodically increasing and decreasing the distance between the axis of the said shaft and the said airplane thus creating pulsating centrifugal force of the character referred to; third, disconnecting the said airplane from the said connecting means.

9. A method for forced landings of an airplane consisting of, first, rotating a connecting means around a driven shaft to which it is attached by its one end; second, progressively unwinding the other end of the said connecting means thus increasing progressively the radius of rotation between the said other end and the said shaft and simultaneously periodically increasing and decreasing the distance between the axis of the said shaft and the said other end of the said connecting means, said unwinding continued until the desirable radius and speed of rotation of the said other end is reached; third, the said airplane to fly approximately following the trajectory described by the said other end of the said connecting means at approximately the same speed at which the said other end rotates; fourth, establishing a mechanical inter-connection between the said other end and the suitable attachment on the plane; fifth, progressively diminishing the said distance between the said axis of the said shaft and the said other end of the said connecting means by winding up the said connecting means, whereby, the said airplane is pulled toward the said shaft; sixth, stopping the rotation as soon as the said distance is reduced to the desired degree suitable for landing.

10. A device for launching or landing an airplane comprising a supporting frame, a vertical shaft mounted thereon, a motor to rotate the said shaft, means to control the speed of rotation of the said shaft, an arm provided on the said shaft, means to continuously and periodically decrease and increase the distances between the axis of the said shaft and the free end of the said arm during the said rotation, a flexible connection mounted on the said free end of the said arm, means to wind and unwind the said flexible connection during the said rotation, means attached to one end of the said flexible connection to connect the said airplane with the said flexible connection.

GEORGE ALEXIS RUBISSOW.